Figure 1:
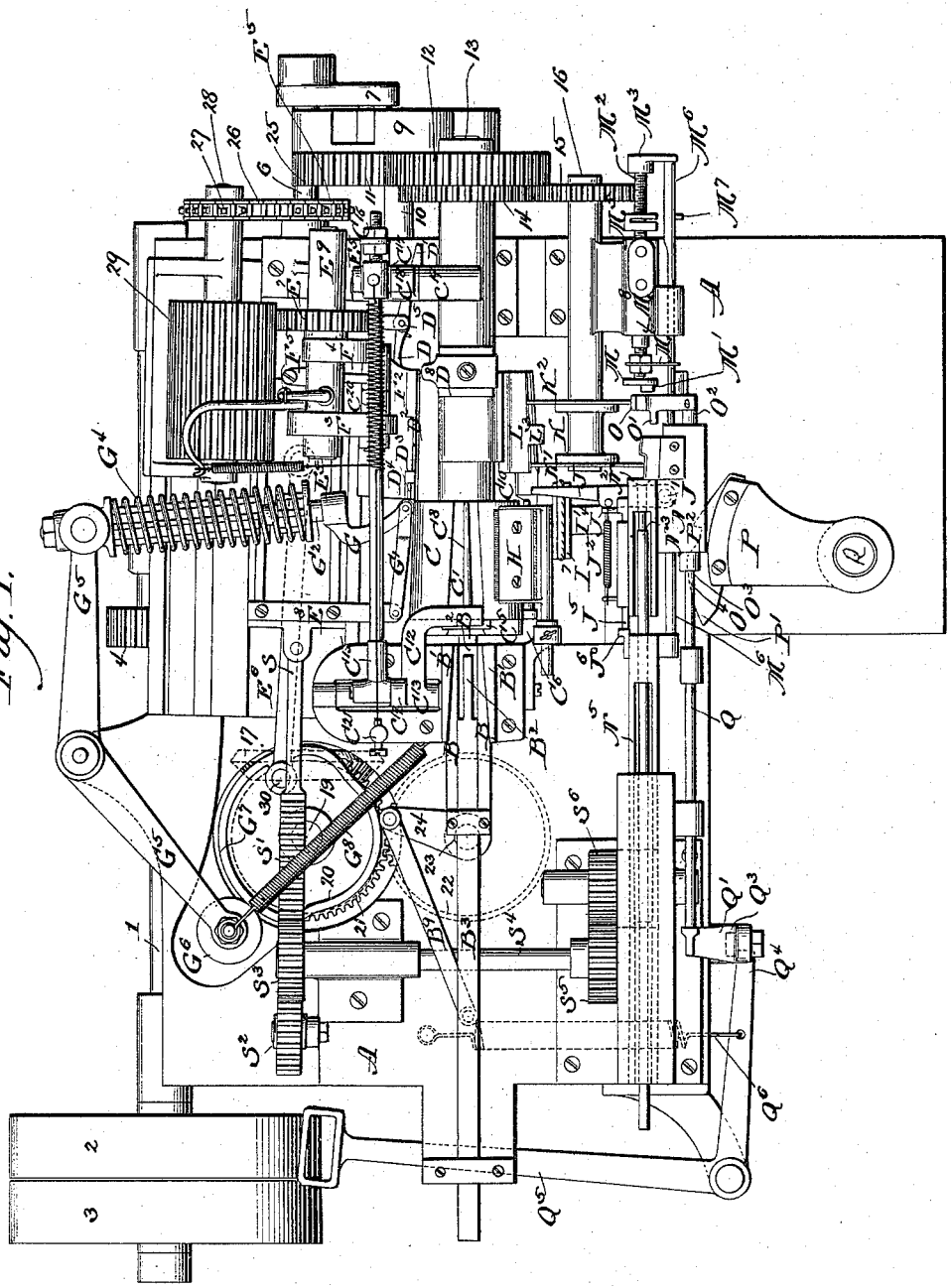

(No Model.)　　　　　　　　　10 Sheets—Sheet 1.

H. BILGRAM.
CIGARETTE MACHINE.

No. 565,851.　　　　　　　Patented Aug. 11, 1896.

WITNESSES:　　　　　　　　　　　　INVENTOR:

(No Model.)  10 Sheets—Sheet 3.

H. BILGRAM.
CIGARETTE MACHINE.

No. 565,851.  Patented Aug. 11, 1896.

WITNESSES:  INVENTOR:

(No Model.) 10 Sheets—Sheet 4.

H. BILGRAM.
CIGARETTE MACHINE.

No. 565,851. Patented Aug. 11, 1896.

WITNESSES:

INVENTOR:
Hugo Bilgram
by his atty
Francis T. Chambers (No Model.) 10 Sheets—Sheet 5.

H. BILGRAM.
CIGARETTE MACHINE.

No. 565,851. Patented Aug. 11, 1896.

WITNESSES:

INVENTOR:
Hugo Bilgram
by his atty.
Francis T. Chambers (No Model.) 10 Sheets—Sheet 6.

H. BILGRAM.
CIGARETTE MACHINE.

No. 565,851. Patented Aug. 11, 1896.

WITNESSES:
Earl F. Ayres
D. Stewart

INVENTOR:
Hugo Bilgram
by his atty.
Francis T. Chambers (No Model.) 10 Sheets—Sheet 7.

H. BILGRAM.
CIGARETTE MACHINE.

No. 565,851. Patented Aug. 11, 1896.

WITNESSES:
Edw. F. Ayres
L. Stewart

INVENTOR:
Hugo Bilgram
by his atty.
Francis T. Chambers (No Model.) 10 Sheets—Sheet 8.
H. BILGRAM.
CIGARETTE MACHINE.
No. 565,851. Patented Aug. 11, 1896.
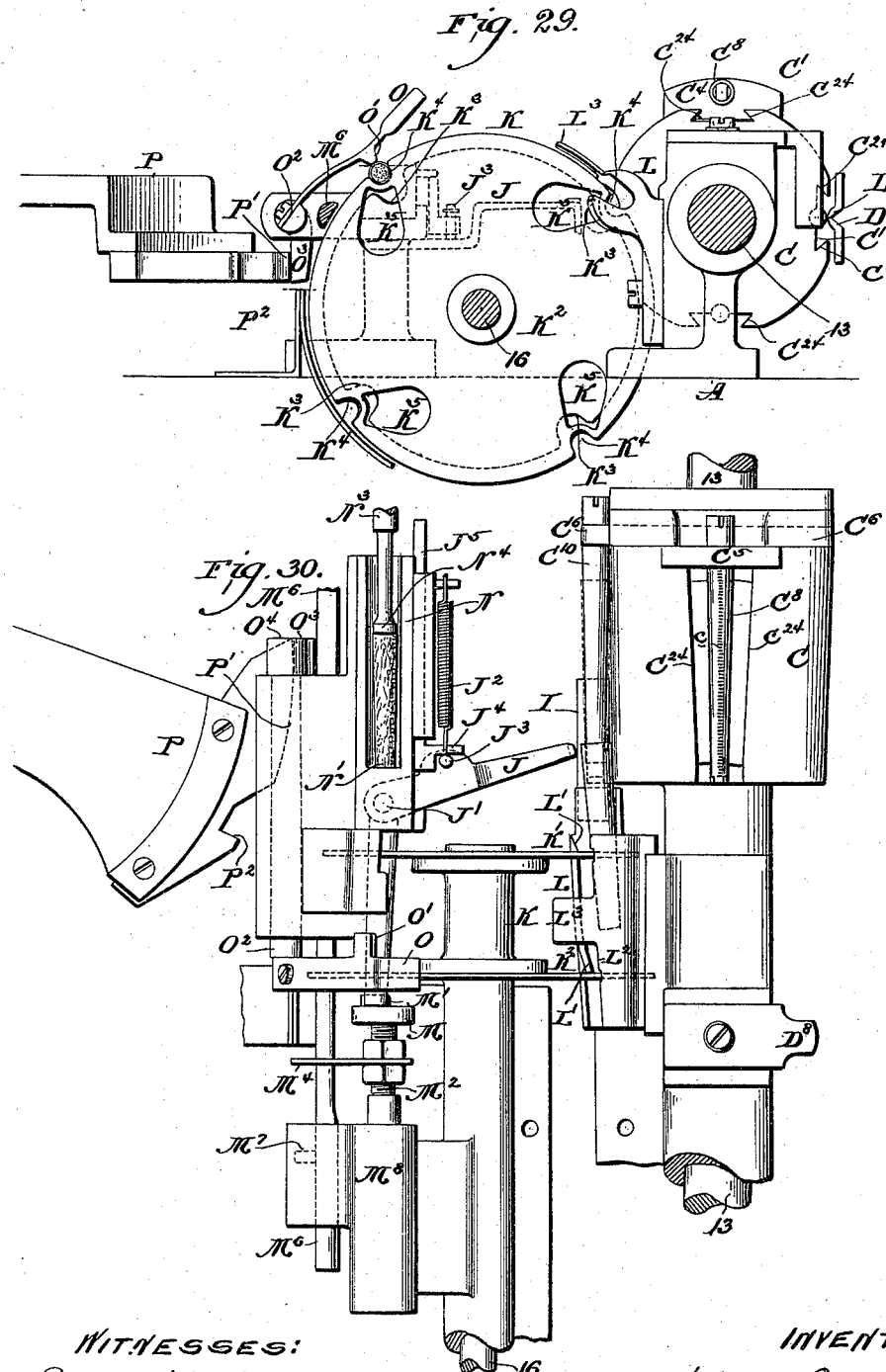
WITNESSES:
Edw. F. Ayres.
D. Stewart.
INVENTOR:
Hugo Bilgram
by his atty.
Francis T. Chambers

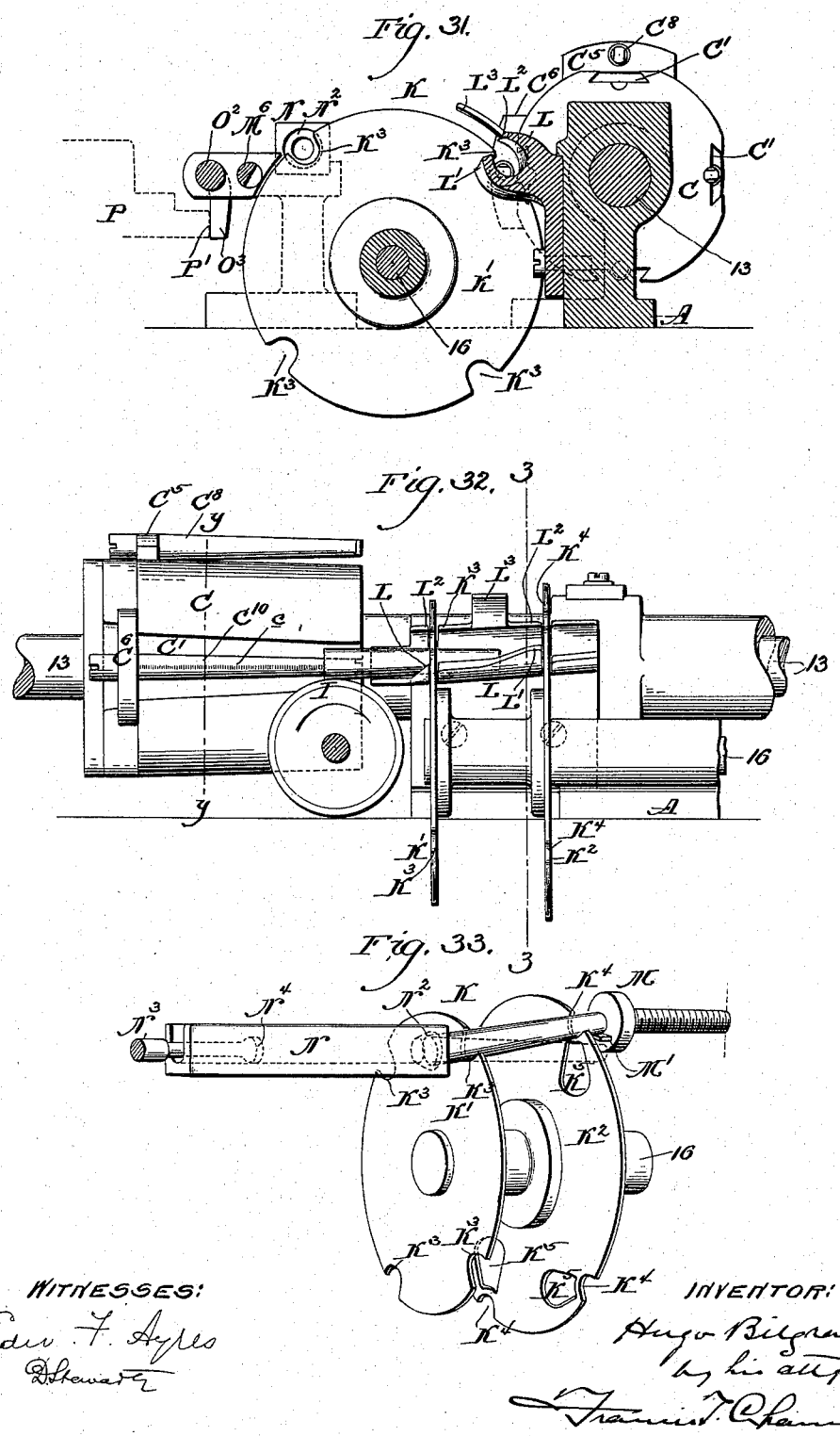

(No Model.)

10 Sheets—Sheet 10.

H. BILGRAM.
CIGARETTE MACHINE.

No. 565,851.  Patented Aug. 11, 1896.

WITNESSES:  
Edw. F. Ayres  
D. Stewart

INVENTOR:  
Hugo Bilgram  
by his atty.  
Francis T. Chambers

UNITED STATES PATENT OFFICE.

HUGO BILGRAM, OF PHILADELPHIA, PENNSYLVANIA, ASSIGNOR, BY MESNE ASSIGNMENTS, TO THE BONSACK MACHINE COMPANY, OF SALEM, VIRGINIA.

CIGARETTE-MACHINE.

SPECIFICATION forming part of Letters Patent No. 565,851, dated August 11, 1896.

Application filed June 21, 1894. Serial No. 515,213. (No model.)

*To all whom it may concern:*

Be it known that I, HUGO BILGRAM, a citizen of the United States, residing in the city and county of Philadelphia, in the State of Pennsylvania, have invented a new and useful Improvement in Cigarette-Machines, of which the following is a true and exact description, reference being had to the accompanying drawings, which form a part thereof.

My invention relates to the construction of machinery for making cigarettes, and particularly to the mechanism for making and filling the paper cigarette-tubes.

I may further say that my invention consists, in part, of improvements upon and in part of additions to certain mechanism invented by James A. Bonsack, of Philadelphia, Pennsylvania, the said Bonsack's inventions being described and claimed in his pending applications for Letters Patent, one filed August 2, 1892, Serial No. 441,914, and the other filed April 28, 1893, Serial No. 472,228.

The object of my invention is, in the first place, to improve the mechanism for feeding the paper blanks and converting them into tubes, which was invented by the said Bonsack, and, in the second place, to supplement the said Bonsack's tube-forming mechanism with novel devices for removing, transporting, and filling tubes, and, as a part of this mechanism, to provide automatic means for stopping the operation of the cigarette-machine in case tubes are not properly formed or filled.

The nature of my improvements will be best understood as described in connection with the drawings, in which they are illustrated, and in which—

Figure 2:
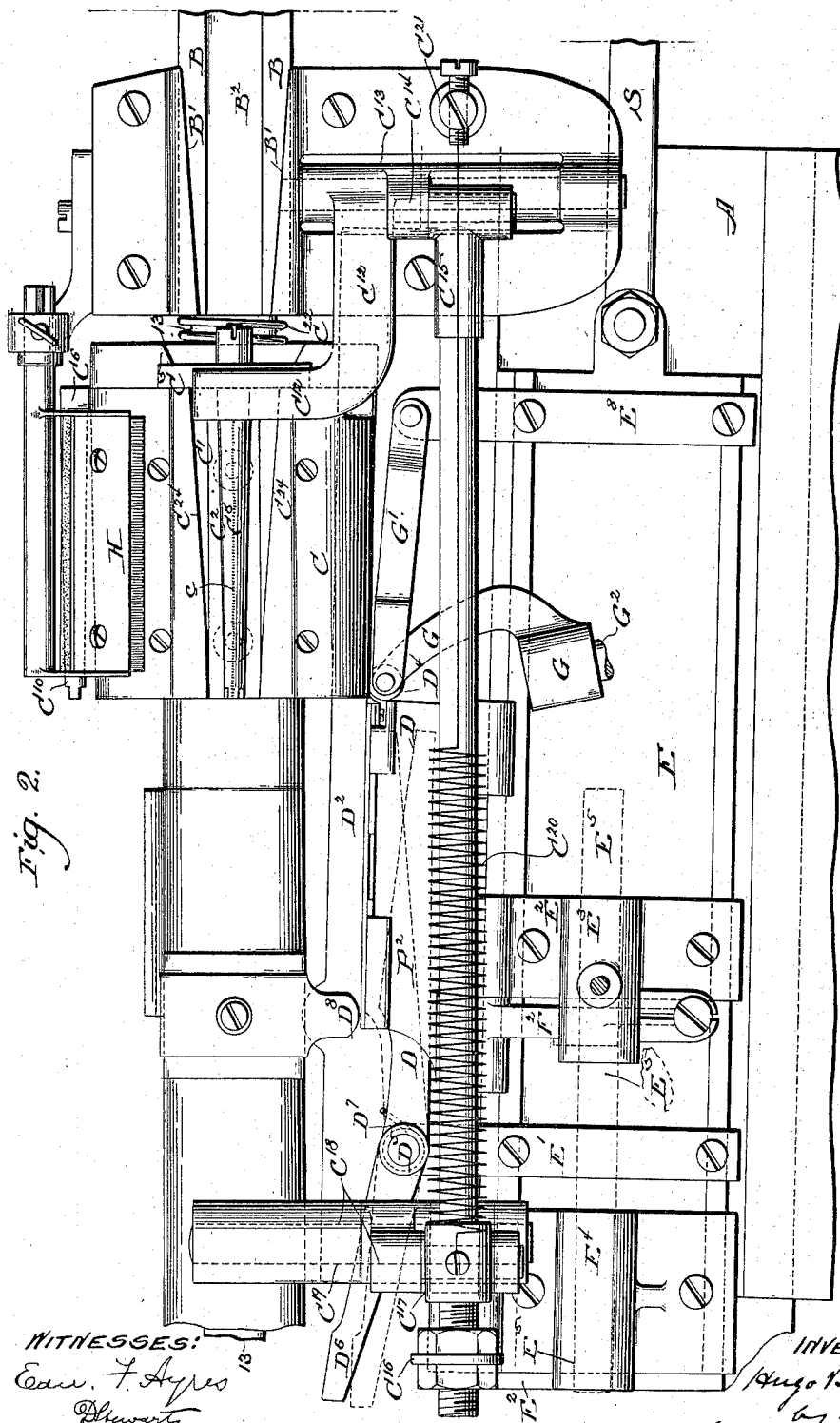
Figure 3:
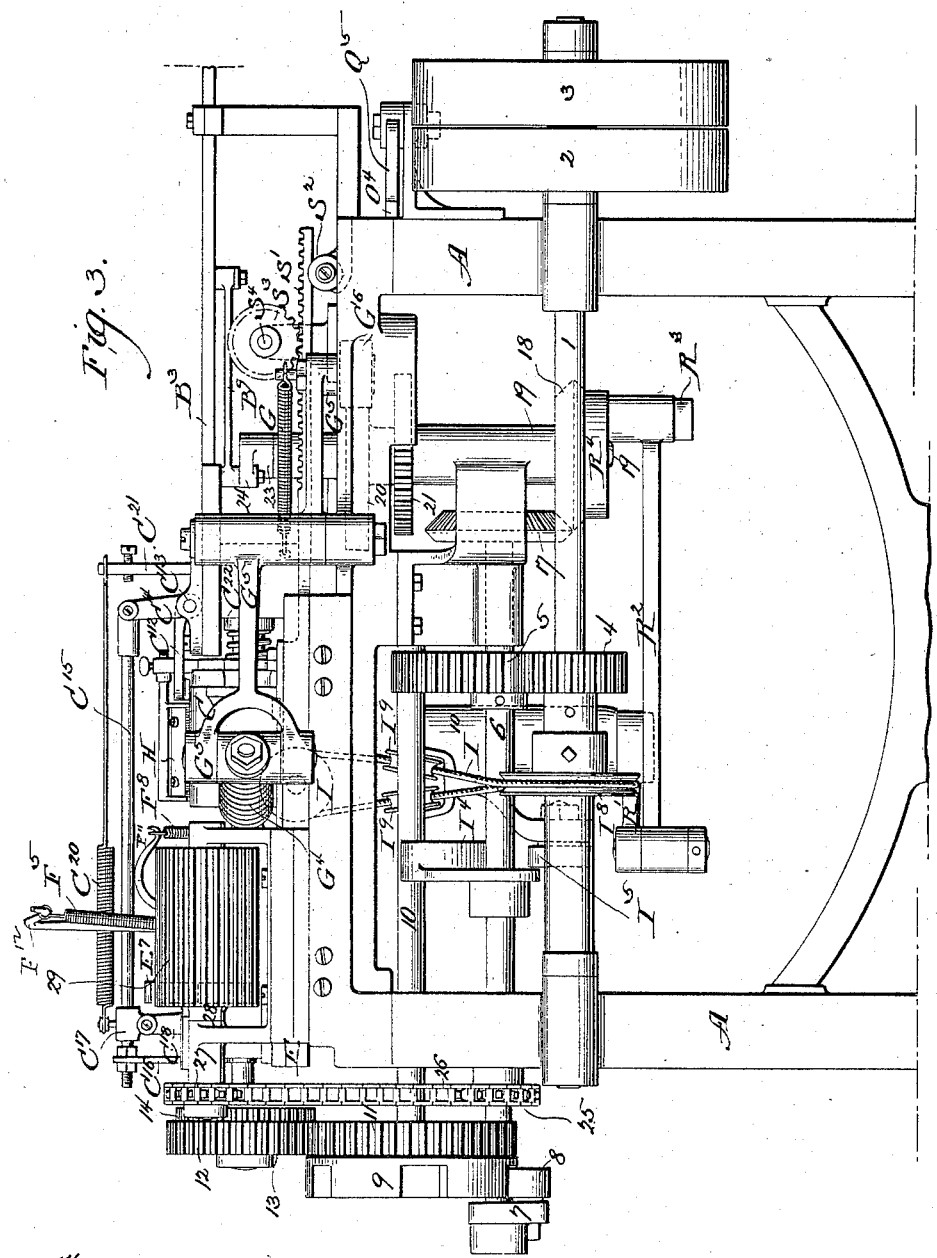
Figures 4, 34:
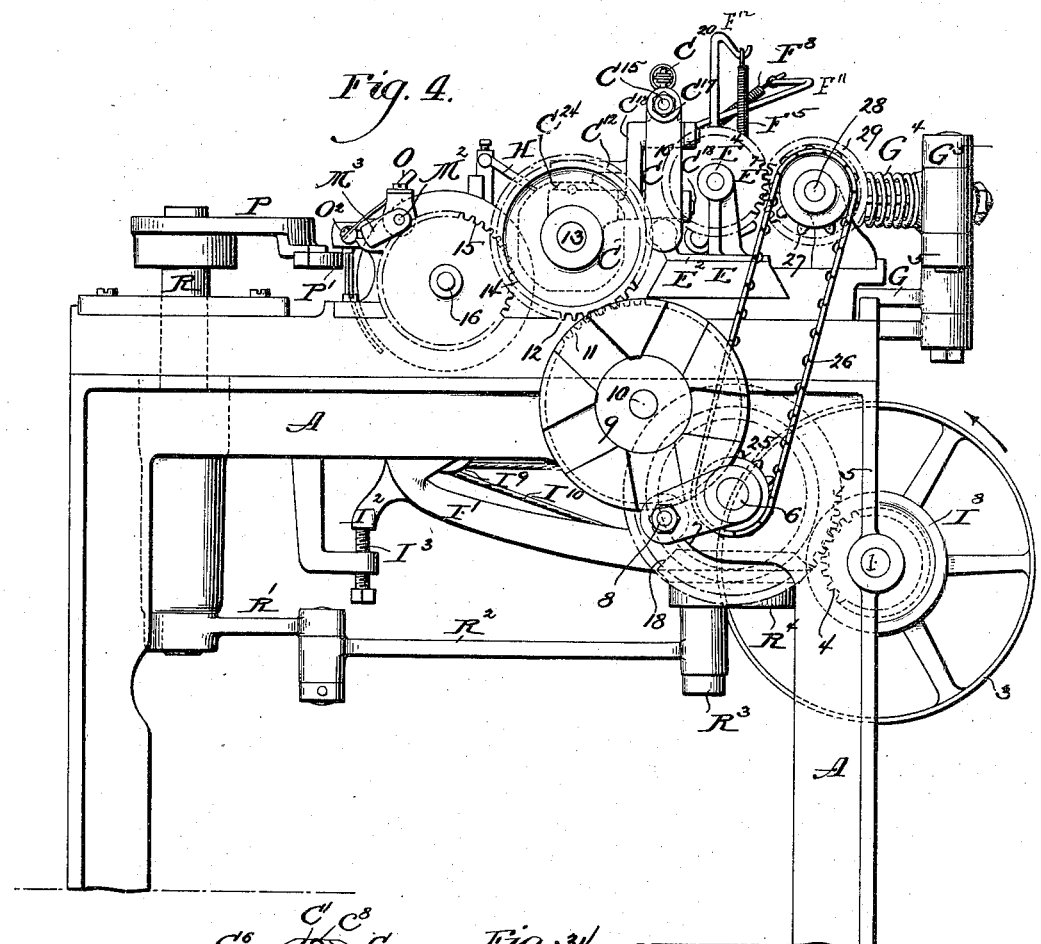
Figure 5:
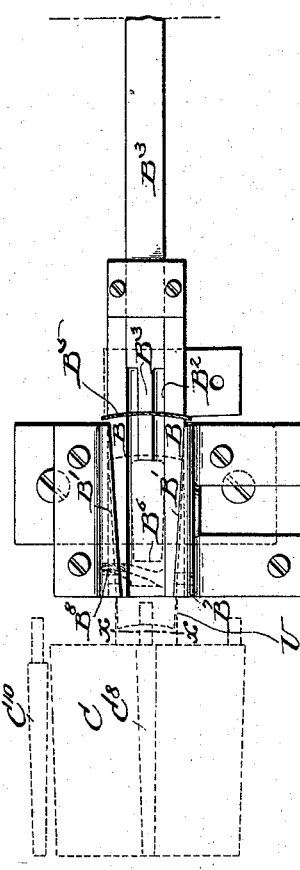
Figure 6:
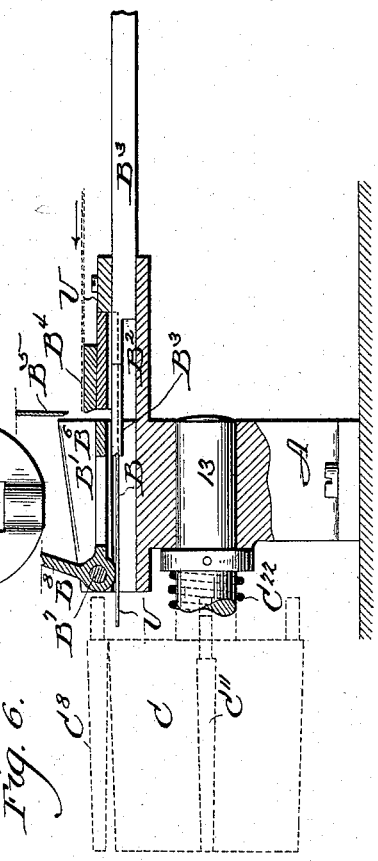
Figure 7:
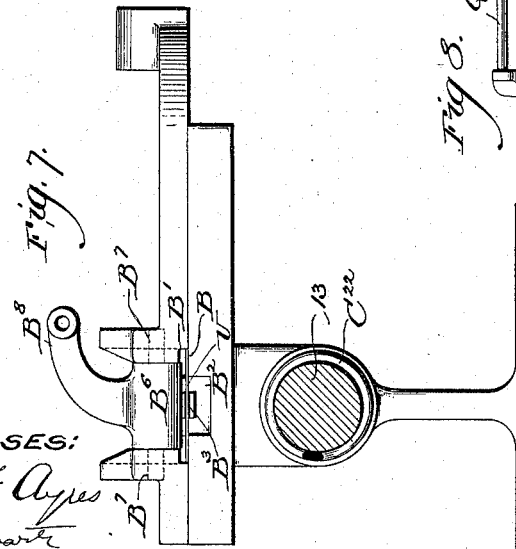
Figure 8:
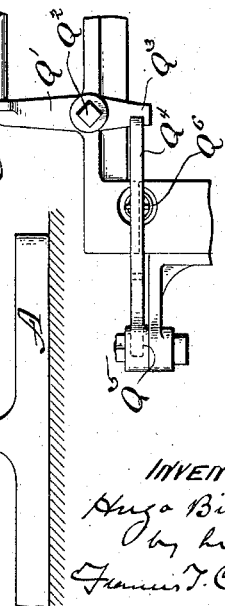
Figure 10:
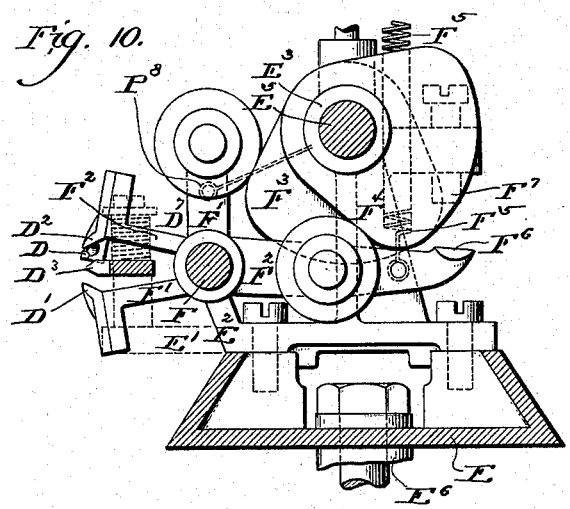
Figure 14:
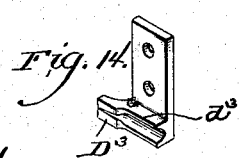
Figure 12:
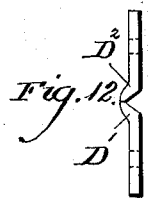
Figure 11:
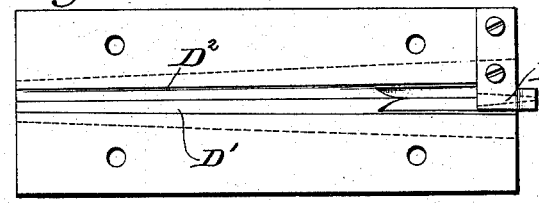
Figure 13:
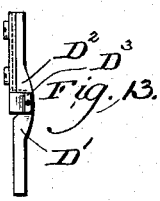
Figure 9:
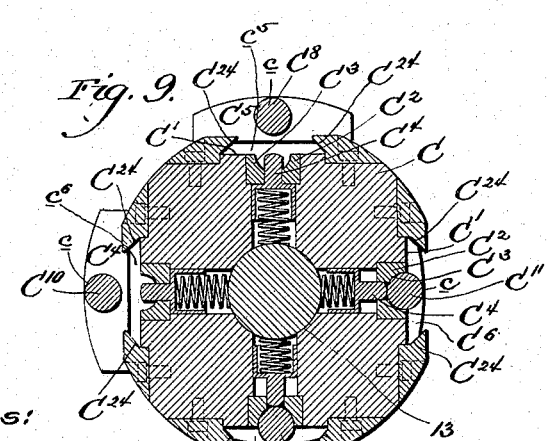
Figure 15:
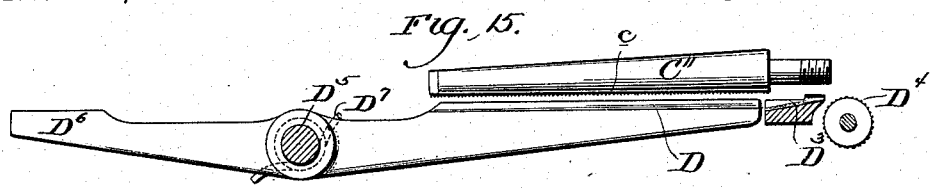
Figure 16:
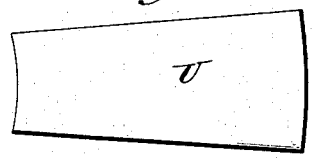
Figure 17:
Figure 35:
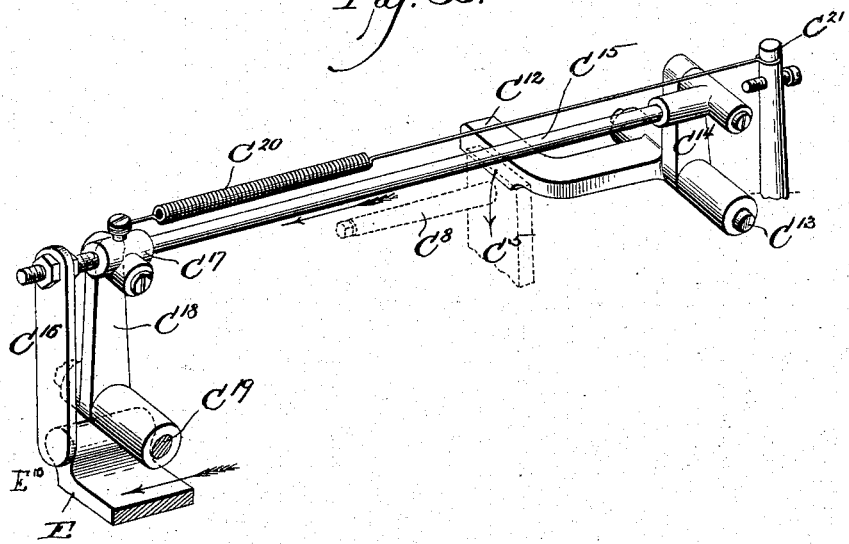
Figure 36:
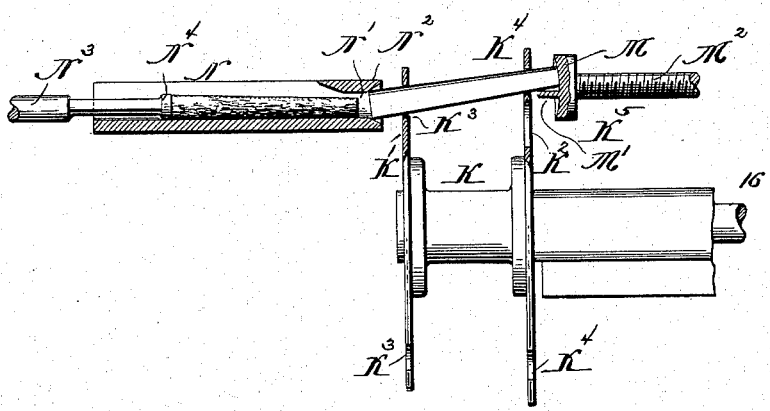

Figure 1 is a plan view of the portion of a cigarette-machine to which my invention relates and which is constructed in accordance with my improvements. Fig. 2 is a plan view of a portion of the mechanism shown in Fig. 1, drawn to an enlarged scale. Fig. 3 is a side elevation of the machine. Fig. 4 is an end elevation thereof. Fig. 5 is a plan view, on an enlarged scale, of the feeding device by which the previously-prepared blanks are fed to the tube-forming mechanism. Fig. 6 is a longitudinal sectional elevation taken through the center line of the blank-sustaining table shown in Fig. 5. Fig. 7 is an elevation of the feeding mechanism from the rear or delivery side thereof, taken, for instance, on the section-line $x$ $x$ indicated in Fig. 5. Fig. 8 is a side view of a portion of the belt-shifting mechanism shown in plan on Fig. 1. Fig. 9 is a cross-sectional view of the matrix-holder and mandrels connected therewith, taken on the section-line $y$ $y$ of Fig. 32 and shown on an enlarged scale. Fig. 10 is a side elevation of the mechanism which completes the formation of a blank into a tube around the mandrels, the slide to which the mechanism is attached being shown in section. Fig. 11 is an enlarged view of the plates forming the active edges of the jaws by which the edges of the blanks to form a tube and also the seaming device by which the abutted ends of the paper are folded over. Fig. 12 is an end view of the said jaws; Fig. 13, also an end view of the same, taken from the opposite end from Fig. 12 and showing the seam-curler. Fig. 14 is a perspective view of the seam-curler. Fig. 15 is a plan view, on an enlarged scale, showing the alining-finger, the seam-curler, and the crimping-wheel in connection with one of the mandrels. Figs. 16 and 17 are respectively views of the paper blank and of the cigarette-tube formed therefrom. Figs. 18, 19, 20, 21, 22, and 23 are views illustrating the various operations performed upon the blank to convert it into a cigarette-tube; and Figs. 24, 25, 26, 27, and 28 are views, on an enlarged scale, showing the consecutive result effected by the operative devices which form the seam of the tube. Fig. 29 is an end elevation of the matrix-holder, the carrier-wheel, chute through which the tubes are carried from the mandrels to the carrier, a device for moving the tubes into the carrier, and my device for automatically stopping the machine. Fig. 30 shows the same parts in plan with the addition of the mechanism for filling the tubes with tobacco. Fig. 31 is a cross-section taken on the line 3 3 of Fig. 32. Fig. 32 is an elevation showing the matrix-holder, carrying-wheel, chute, and one of the devices for moving the tubes from the mandrel through the chute. Fig. 33 is a perspective view of the carrier-wheel and the mechanism for filling tubes supported thereon. Fig. 34 is a side elevation of one of the devices used for withdrawing the tubes from the mandrel. Fig. 35 is a perspective view of mechanism employed to actuate the slides to which the mandrels are attached; and Fig. 36 is a sectional view of the same parts shown in the perspective view, Fig. 33.

A indicates the frame of the machine, and B the table upon which the previously-prepared blanks are delivered prior to being fed to the tube-forming mechanism. The machine, as shown, is adapted for the manufacture of conical cigarettes, for which purpose the blanks are cut to the form indicated in Fig. 16.

In Figs. 5 and 6 the blanks indicated by the letter U are shown as being fed to the table B over a support or table $B^4$, the front edge of which coacts with a knife (indicated at $B^5$) to sever the blank after it has been projected over the table B, $B^6$ indicating a plate pivoted at $B^7$ and having attached to it an arm $B^8$, by which it is rocked upon the said pivot through appropriate mechanism. (Not shown.) The plate is raised when a blank is being fed above the table and pressed down or allowed to fall when the blank is severed, its function being to carry the blank down, so that it will lie flat upon the table B, as indicated in Figs. 6 and 7.

$B^3$ indicates a reciprocating plunger moving in a slot $B^2$ on the table B and arranged so that its end will abut against the rear end of the blank and push it forward upon one of the tables $C'$ of the matrix-holder C, Fig. 9. $B'$ $B'$ indicate the side walls of the table B, between which the plunger $B^3$ moves.

The devices indicated above are the invention of James A. Bonsack, and are shown and described in his previously-mentioned patent application, except that the walls $B'$ $B'$ of the table B were parallel to each other in Mr. Bonsack's arrangement. I have ascertained that by this older construction there was, at times, a liability to somewhat displace the blank when delivered to the table, sometimes so much so as to prevent the proper delivery of the blank by the action of the plunger $B^3$, and this difficulty I have overcome by making the walls $B'$ $B'$ converge at the same angle as the converging sides of the blank U, as a consequence of which the blank is properly alined by the said sides as it is fed down between them and caused to take a proper position in front of the plunger. Of course it will be understood that the converging walls $B'$ $B'$ do not extend quite to the table, and that below them there must be, as shown, a passage at least as broad as the wider end of the blank.

C is the matrix-holder, which is supported upon the shaft 13, Fig. 4, and given an intermittent rotary movement which is derived from the main shaft 1 by the following train of gear, to wit: the spur-pinion 4 on shaft 1, meshing with a pinion 5 on shaft 6, and carrying a roller 8, which in each revolution engages one of the channels of the star-wheel 9, giving it and the shaft 10, to which it is attached, an intermittent step-by-step movement of revolution. The gear 11 on shaft 10, engaging a gear 12 on shaft 13, gives the said shaft and the matrix-holder attached thereto a corresponding intermittent motion. The gearing above referred to can best be followed on Figs. 1, 3, and 4. While referring to the gear of the machine I will note that the plunger $B^3$ is actuated through a link $B^9$ (see Figs. 1 and 3) by a crank 24, attached to a shaft 23 and driven by means of a gear-wheel 22, meshing with a driving-gear 21, secured to the shaft 19, which is driven from the shaft 6 by means of the miter-wheels 17 and 18, the said shaft 6 being driven, as before noted, from the gear-wheel 4 on the main shaft 1.

Referring again to the matrix-holder C, the construction of which is best shown in Figs. 2 and 9, $C'$ indicates flat tables formed or secured to the face of the holder and each adapted to register in turn with the blank-supporting table B and to receive the blank therefrom when the blank is thrust forward by the plunger $B^3$. The tables $C'$, it will be understood, are at rest when the blank is being delivered to them. Along the center of each table $C'$ lies a matrix $C^2$, having a cavity $C^3$, properly of semicylindrical form, or rather semiconical form, when the machine is used to make conical cigarettes. Spring-supported fingers $C^4$ are preferably provided, (see Fig. 9,) their main function being to hold the blanks against the mandrels and prevent them getting out of alinement when the mandrels are moved to force the blanks into the matrices. $C^5$ and $C^6$ are mandrel-holding slides free to move longitudinally in guide-slots on the end of the matrix-holder C, the spring $C^{22}$, Figs. 3 and 6, abutting against them in order to insure their being held with sufficient friction, so as not to move in their guides except at the proper time. On each end of these slides, which are somewhat longer than the diameter of the holder C, is secured a mandrel, (indicated in the drawings at $C^8$, $C^9$, $C^{10}$, and $C^{11}$,) each mandrel being alined above its corresponding matrix, and each having the form of the cigarette-tube to be made. Each mandrel is also preferably formed with its outer face serrated, as indicated at $c$.

Figure 18:
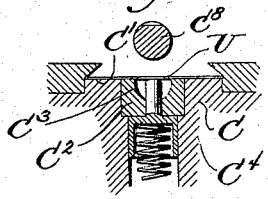
Figure 19:
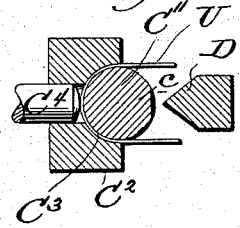

It will be understood of course that when the blank is fed to the uppermost table $C'$ the mandrel $C^8$, for instance, in Fig. 9, will be, as shown in that figure, elevated above the table, so that the blank can pass underneath it, the blank entering the table through an opening in the mandrel-slide, such as is indicated at $c^5$ $c^6$ in Fig. 9. The parts now being arranged with respect to each other, as shown in Fig. 18, the mandrel is pressed down into the matrix, carrying the paper blank with it and forming it into U shape, such as is indicated in Fig. 19. The corresponding mandrel secured to the same slide is by the same motion thrust out from the matrix, carrying with it a completed cigarette-tube, and the necessary motion is given to the mandrel-slide by means of the lever-arm $C^{12}$, Figs. 2 and 35, fastened to a sleeve or shaft $C^{13}$, to which is also attached a lever-arm $C^{14}$, from which extends a rod $C^{15}$, to the farther end of which is connected the adjustable elastic arm $C^{16}$, which extends down into the path of a lug $E^{10}$, attached to and moving with the reciprocating slide E. This farther end of the rod $C^{15}$ is supported, as shown, on a swivel-head $C^{17}$, attached to a rock-lever $C^{18}$, pivoted in turn on a stud $C^{19}$, attached to body of machine. A spring $C^{20}$, attached to a post $C^{21}$ and, as shown, to the swivel-head $C^{17}$, serves to keep the rod $C^{15}$ normally drawn backward and the lever $C^{12}$ in its uppermost position. The elastic arm $C^{16}$ and the lug $E^{10}$ on slide E are so arranged as to engage promptly at the end of the forward motion of the slide E with the result of acting on the lever $C^{12}$, with the mechanism described and depressing it against the then uppermost slide, which is caused to move downward, carrying its mandrel to engage the blank and form it into a U shape, as already described. This mandrel-actuating mechanism is best shown in Figs. 2 and 35 of the drawings, and constitutes one of the features of my present invention, taking the place of a different device for actuating the mandrels shown in Mr. Bonsack's application of August 2, 1892. In the parts described I have also made an additional improvement upon the Bonsack device in providing the table C' with the outwardly-converging and undercut side walls $C^{24}$. (Best shown in Fig. 9.) By so constructing the side walls I attain the best results with regard to giving clearance for the blanks as they are fed to the table and at the same time preventing them from becoming displaced thereon and giving full clearance for the upward motion of the blank edges when thrown up in forming the first U-fold. After the mandrel has been forced into its matrix to bring the blank to the U form, as described, the matrix-holder C makes a quarter-revolution or is moved through an arc of ninety degrees, the blank then having the position and shape shown in Fig. 19 and remaining in the same position while from a U shape it is being converted into a tube. The mechanism by which this is accomplished I will now describe, premising my description, however, with the statement that, as shown, it is, with the exception of one feature, not my invention, but that of Mr. Bonsack, described in his application of August 2, 1892.

Figure 20:
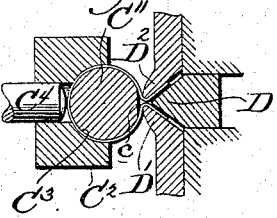
Figure 24:
Figure 25:
Figure 26:
Figure 27:
Figure 28:
Figure 23:
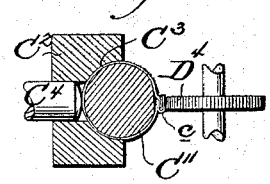

The folding and seaming mechanism is supported on a slide E, Fig. 10, which is given a reciprocating motion by means of a link $E^6$, (see Fig. 1,) attached to a crank-pin 30, which is driven by the shaft 19, and, as shown, attached to the top of a cam 20, secured on said shaft. (See Fig. 1.) To an arm E', attached to said slide E, is pivotally secured the alining-finger D. (See Figs. 1, 2, 15, 19, and 20.) The pivot-pin is indicated at $D^5$, and the spring, as indicated at $D^7$, normally keeps the alining-finger back out of operative position. A heel extension $D^6$ of the finger moves it forward at proper time and keeps it in its forward position by coming in contact with a stationary pin $D^8$, Fig. 2. The edge of this finger D lies parallel with the mandrel about which the U-shaped blank is formed, and when brought to operative position it lies with respect to the mandrel as shown in Figs. 15, 19, and 20, its function being to prevent the edges of the paper from lapping each other when they are brought together over the mandrel, as indicated in Fig. 20, and so that the two flaps from which the seam is to be formed will extend out from the tube, as indicated in Fig. 24.

Figure 22:
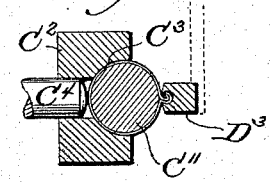
Figure 21:
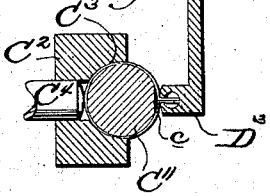

Attached to suitable bearings, as $E^3$ $E^4$, &c., supported on slide E, is a shaft $E^5$, (best shown in Figs. 1, 2, and 10,) and to this shaft is attached a spur-wheel $E^7$, which remains constantly in gear with an elongated spur-wheel 29, attached to and driven by the shaft 28. This shaft is driven by the sprocket-wheel 27 and chain 26, which passes over the sprocket-wheel 25 on the shaft 6. (See also Fig. 4.) To the shaft $E^5$ are connected the cams $F^3$ and $F^4$, acting, respectively, on cam-rollers secured to the levers F' and $F^2$, said levers being pivoted on the shaft F, supported by the bearing $E^2$, attached to the slide E, each of said levers having at its outer extremity a jaw, as indicated at D' $D^2$. (See Figs. 10 to 14 and 20.) The actuating mechanism of the levers is such as to cause the jaws to close together after the alining-finger D has come to operative position, and so as to bring the edges of the blank together in the position shown in Fig. 20. This being accomplished, the finger D has performed its function, and as the slide continues its forward motion its heel extension $D^6$ leaves contact with the stationary finger $D^8$ and the spring $D^7$ draws it back out of operative position, the seam then assuming the position indicated in Fig. 24. At the extreme end of the jaw $D^2$ is situated the curler or seam-folder $D^3$, (see Figs. 10, 11, 13, 14, and 15,) and as the slide E moves, carrying the closed jaws forward, the seam-folder operates to fold over the seam. The seam as it leaves contact with the jaws moves into the conical opening of the curler $D^3$, which gradually curls or folds it over, as indicated in Figs. 21 and 22, and with the effect shown in Figs. 25, 26, 27, and 28.

In Mr. Bonsack's machine the curler is situated at the extreme end of and entirely beyond the jaws D' $D^2$. I have improved the machine by recessing the inside of the jaws at their rear ends, as indicated in Figs. 11 and 13, and so that a portion $d^3$, Fig. 14, of the curler, which may, if desired, include practically all of it, will lie between them. By this construction the outside of the jaws form one wall of the curler for at least a portion of its length and until the seam is partly or wholly curled, and the seam is better and more strongly held than in the prior construction. Immediately in the rear of this curler or seam-folder is situated a crimping-wheel, as indicated at $D^4$, (see Figs. 1, 2, 15, and 23,) and as the curler passes from over the folded seam the crimping-wheel follows it, crimping the seam between it and the serrated face of the mandrel with the result of completing and making permanent the seam and the tube. The crimping-wheel $D^4$ is pivoted on a link $G'$, attached to a bracket $E^8$ of the slide E, and by which the crimping-wheel is made to follow the motions of the slide. The crimping-wheel $D^4$ is journaled also on an arm G, secured to a rod $G^2$, which is actuated by means of the spring $G^4$, and a proper alining-guide attached to one arm of a pivoted lever $G^5$, the other end of said lever $G^5$ having upon it a cam-roller $G^6$, held in contact with the cam 20 by means of spring $G^8$. The cam 20, as previously pointed out, is attached to the shaft 19 and its form is such as, acting through the connections described, to press the crimping-wheel $D^4$ against the mandrel as it moves over the seam to crimp it and to draw it back away from the mandrel during the return stroke of the slide E. I may here mention that the springs $F^5$, Figs. 1, 3, and 10, and $F^8$, Figs. 3 and 4, are attached, respectively, to the levers $F^2$ and $F'$ and to arms $F^{12}$ and $F^{11}$, serving to keep their cam-rollers in contact with the cams $F^4$ and $F^3$.

The seam being completed, another quarter-turn is made by the matrix-holder C, and during the next rest the mandrel carrying the completed tube is pushed out from the matrix, the corresponding mandrel on the same slide being that uppermost and being thrust into the matrix. The next quarter-revolution of the holder C brings the mandrel to the position indicated at $C^{10}$ in Fig. 9, at which position the mechanism to be hereinafer described for removing the tube comes into operation. Before describing this operation, however, I will call attention to the oiling device H, (shown in Figs. 1, 2, and 4,) the function of which is to apply a thin film of oil to the outer or serrated face of each mandrel, the film being applied after the completed tube is stripped from it and before the mandrel comes into operation upon another blank. As shown, this device consists of a fine delicate brush, and great care must be taken that it is so arranged as to apply an exceedingly-delicate film to the mandrel. This is an invention of my own, and has for its object to facilitate the removal of the tube from the mandrel, preventing the crimped paper from sticking to it, as is apt to be the case where the mandrel is perfectly free from oil. It will be understood, however, that only so much oil is to be applied as will prevent this sticking of the paper and not enough to appreciably oil the paper itself.

The remaining parts of the machine shown in the drawings and which I am now about to describe are in the nature of supplementary mechanism to that devised by Mr. Bonsack and hereinabove described with my improvements thereon.

The cigarette-tube having been formed as above described, it is next necessary to remove it from the mandrel and deliver it to the mechanism for further transporting and filling it. This I do, at least in part, by a stripper acting intermittently and by rubbing contact along a smooth side of the mandrel. The removal from the mandrel I preferably effect by the consecutive action of two devices, to wit, the friction-wheel I and the pushing-finger J. The wheel I, which is my preferred form of frictional stripper, (see Figs. 34, 30, and 32,) is journaled upon a stud, which in turn is secured to the end of the pivot-arm $I'$, which, as shown, is pivoted upon the shaft 1. The shape and arrangement of the lever-arm are such that when it is raised the wheel I is brought into contact with the side of a mandrel or rather of the tube covering the mandrel when in the position indicated at $C^{10}$ of Fig. 34. The form and adjustment of the cam and roller, of course, determine the upward motion of the arm, and its downward motion must be such as to remove the wheel I from the path of the mandrels as they revolve with the matrix-holder C. It is also necessary that the arm $I'$ should not move downward far enough to prevent the engagement of the cam mechanism which raises it. As shown, I have provided a lug $I^2$ on the arm $I'$, which, by coming in contact with the set-screw $I^3$, limits the downward motion of the arm.

$I^4$ is a cam, (best shown in Figs. 3 and 34,) which is secured to and revolves with the shaft 6 and which, once in each revolution of said shaft, engages the cam-roller $I^5$, secured upon the lever-arm $I'$, and through it raises the said arm and brings the roller I into contact with the mandrel. The length of this cam regulates the duration of time during which the wheel I will act, and its shape determines the degree of pressure with which the friction-wheel shall press against the mandrel. The greatest pressure should be exerted during the first part of the contact in order to start the tube from the mandrel. When the tube has once commenced to slip over the mandrel, little or no more than the contact of the wheel with the paper is required to keep it in motion, and I prefer, therefore, to slightly relieve the cam-surface, as indicated at $i^4$.

$I^7$ indicates a pulley-wheel connected to the friction-wheel I and driven from a pulley $I^8$ on the shaft 1 through the belt connection $I^{10}$, which, as shown, passes from the pulley $I^8$ to the pulley $I^7$ and under the pulleys $I^9$ $I^9$.

While a friction-wheel, such as I, or other frictional stripper is well adapted to start the tube upon the mandrel and while it can be so placed and arranged as to carry the tube entirely off of the said mandrel, I have found it advisable to supplement it by means of pushing-finger J. (See Figs. 1, 29, and 30.) This finger is pivoted at J' and is moved so as to engage the rear end of the tube while still upon the mandrel and after the friction-wheel has left contact with it and push it off of the end thereof and into the receptacle provided for it. The finger J is held in the position it occupies before engaging the tube by means of a spring $J^2$, fastened to a pin $J^3$ on the finger and to a fixed pin on the machine, the finger is thrust forward at the proper time to engage the tube by means of the foot $J^4$, secured to or formed with the slide $J^5$, the said foot engaging, as shown, the pin $J^3$, and the slide $J^5$ is pressed forward at the proper time by means of a presser-foot $J^6$, attached to and moving with the slide $N^5$, which, having other functions, will be hereinafter described.

In the mechanism shown the tubes as they are drawn from the mandrels are delivered to a carrier, preferably, as shown, made in the form of a wheel having receptacles for cigarette-tubes corresponding with the number of mandrels, and preferably formed of two plates adapted to support the tube near its two ends.

The carrier is indicated at K and the two plates of which it is composed at K' and $K^2$, said plates being connected to the shaft 16, which, through the pinion 15, receives intermittent motion from the shaft 13 and a pinion 14, secured on said shaft, Figs. 4 and 33. In order to conduct the cigarette-tubes to the proper position on the carrier I employ a chute L, which extends from a point near the end of the mandrel through the carrier, being made in segments to permit the carrier to come into registration with the chute and at the same time to rotate freely, as best shown in Figs. 30, 31, and 32. This chute is preferably inclined, as shown, in conformity with my preferred construction of carrier to be hereinafter described.

The chute L is of conical form, corresponding with the shape of the cigarette-tubes, the tubes being brought to correct position on the carrier when or just before they fit against the sides of the chute. In order to prevent the tubes from jumping out of the chute and carrier or becoming otherwise displaced as it is pushed into position, I make the chute, at least in part, of somewhat more than semicircular section, so that its lips or edges L' and $L^2$ will approach closer together than the diameter of the corresponding part of the tube, and I also prefer to provide a guide-finger $L^3$, extending out from the upper lip $L^2$ over the top of the carrier to further prevent displacement of the tube. The tube, being delivered in the chute and carrier while the carrier is stationary, is carried out of the chute by the next consecutive motion of the carrier. The tubes being empty will readily collapse sufficiently to escape from the contracted lips of the chute, but the contraction is so small as not to permanently affect the shape of the tube, which will promptly spring out again, when it has left the chute, to its natural form.

Returning to the carrier wheels or plates, (see Figs. 1, 29, 30, 31, 32, 33, and 36,) $K^3$ and $K^4$ indicate notches formed in the peripheries of the plates K' and $K^2$, and which, registering with the chute L, receive the tubes as they are delivered from the mandrels and, with their next consecutive motion, transport them to a position in front of the filling-box N, as indicated in Figs. 31 and 33. I prefer to form these notches at different levels, so that the tube is thrown up to an angular position, as shown in the drawings, and in the construction shown I effect this by making the wheel $K^2$ of larger diameter than the wheel K', and I form in the rear wheel $K^2$ a series of openings $K^5$, which are substantially in line with the notches $K^3$ on the wheel K'.

N indicates a filler feed-box in which a properly-shaped and prepared filler is deposited prior to being forced into the paper tubes brought consecutively into registry with the feed-box by the action of the carrier-wheels. This filler feed-box has preferably a tubular end, as indicated at N', Fig. 36, the outside of which registers with the large end of the conical cigarette-tube, being countersunk, as indicated at $N^2$, the angle and size of the countersink thus formed being such that the butt of the inclined cigarette-tube will fit against it.

$N^4$ indicates a plunger moving in the box N, the function of which is to engage the prepared filler, as indicated in Fig. 36, and force it into the tubular blank.

The rod $N^3$ (see Fig. 1) is secured to the slide $N^5$, upon the under side of which is formed a rack (not shown) which is engaged by a broad pinion $S^6$, driven by a pinion $S^5$, attached to a shaft $S^4$, to which is also attached a pinion $S^3$ in engagement with and actuated by the rack S', said rack being connected, as shown at S, with the slide E and supported at its outer end on a roller $S^2$.

In order to hold the tube in position while being filled, I employ a clamp, which registers with the rear end of the cigarette-tube at the time when its front end registers with the feed-box, such a clamp being indicated at M, Figs. 33 and 36, its face being preferably curved or angled, as indicated, so as to fit against the end of the inclined tube. I refer to this as a "clamp" because, preferably, I employ it not only to act passively as a stop or abutment for the tube while the filler is being pushed to place, but also to move forward against the end of the tube and force the front or larger end of the tube into the conical recess $N^2$ of the feed-box, so as actually to clamp the tube between the feed-box and itself prior to the introduction of the filler into the tube, and I may here state that I find it preferable to slightly raise the blank in the act of clamping it, so that it is held entirely by the clamps while being filled and out of contact with the recesses of the carrier-wheels. This is easily accomplished by the proper shaping of the conical face $N^2$ of the feed-box and by the employment of a finger $M'$ on the clamp M, as indicated in Figs. 33 and 36. My reason for raising the tube out of the recesses of the carrier is to avoid any friction which might tend to prevent the tube moving with the clamp as it recedes and the filler is thrust home in the tube. By this arrangement I insure that the tube will move away from the filler-box as soon as it is filled, and avoid the risk of forcing the filler past the small end of the tube.

As shown, the proper motion is given to the clamp M through its supporting-rod $M^2$, which passes through a bearing $M^8$, in which it is free to move longitudinally, but in which by frictional or other resistance its motion is sufficiently opposed to insure its remaining stationary, except at the proper times. To the rod $M^2$, I secure an adjustable stop $M^5$, (shown in the drawings as a nut screwing on the rod,) which regulates the extent to which the clamp M can be moved toward the tube. I also secure to the rod fingers $M^4$ and $M^3$, the finger $M^4$ being preferably adjustable, as by screwing on the rod $M^2$, and being preferably also elastic. The clamp M is actuated by means of the rod $M^6$, which is attached and moves with the slide $N^5$ and the end of which, by coming in contact with the finger $M^3$, moves the clamp back, while a pin $M^7$, secured to the rod $M^6$, by coming in contact with the spring-finger $M^4$, moves the clamp forward. The position of these fingers is such that the pin $M^7$ will engage the spring-finger $M^4$ and move the clamp against the tube in the carrier immediately after the tube comes to position in front of the feed-box, the extent of the motion of the clamp being, as stated above, sufficient to clamp the tube between itself and the conical mouth of the feed-box. The clamp remains stationary in this position until the filler is thrust home in the tube, at which point the end of the rod $M^6$ engages the finger $M^3$ and moves it and the clamp backward. The plunger $N^4$ continuing to move forward at the same time thrusts the filled cigarette out of the mouth of the conical recess in the feed-box, so that the next motion of the carrier will find no impediment to its carrying away the filled cigarette. In Fig. 1 of the drawings the parts are shown in the position which they occupy immediately after the filling of the cigarette-tube.

As the cigarette-machine to which my invention relates is intended to work with considerable speed it is important that the operative should be promptly notified, in case, for any reason, it is working defectively, and I have accordingly provided mechanism by means of which the machine is automatically stopped in case a cigarette-tube is not delivered to the carrier at the proper time, or in case a tube properly delivered to the carrier is not filled with tobacco. This I accomplish by means of the latch-lever O. (See Figs. 1, 4, 29, and 30.) This lever, which extends out over the carrier and has a portion $O'$ arranged to come in contact with a cigarette upon the carrier subsequent to the filling operation, is secured or pivoted to a longitudinally-movable rod $O^2$, which is provided with a downwardly-extending arm $O^3$, which lies in the path of a cam P, said cam being attached to a shaft R and receiving a reciprocating motion by means of the crank-arm $R'$, attached also to the shaft R, and the link $R^2$, attached to the end of the crank-arm $R'$ and to a crank-pin $R^3$, secured to a disk $R^4$, keyed to the shaft 19, as shown. (See Figs. 3 and 4.) The motion of the cam P, Figs. 29 and 30, is such that a portion of the cam-face $P'$ will act to raise and sustain the latch-lever O above the cigarette-tube while it is coming to the position in which it is filled and while it is being filled.

At the end of the filling operation the recessed portion of the cam-face comes opposite to the arm $O^3$ of the latch-lever, so that the said lever is no longer sustained by the cam-face, but is permitted to drop directly upon the cigarette, as indicated in Fig. 29. If a filled cigarette is in place, the latch-lever is sustained by it and the shoulder $P^2$ of the cam does not come in contact with the downwardly-extending arm $O^3$. If, on the other hand, there is no cigarette in the carrier-grooves, or if there is an unfilled tube there, the lever O will fall lower and its arm $O^3$ will come in the path of the shoulder $P^2$, which will carry it and the rod $O^2$ forward with it and stop the machine through proper mechanism connected with the rod. As shown, the end $Q^3$ of this rod abuts against a longitudinally-movable rod Q, Fig. 1, the other end of which abuts against or is connected to one arm $Q'$ of the lever which is pivoted at $Q^2$, (see Figs. 1, 6, and 8,) and the arm $Q^3$ of which lever arrests the arm $Q^4$ of a bell-crank lever $Q^4$ $Q^5$ in such a way as to hold the belt on the fast pulley by means of a belt-shifter on the arm $Q^5$. Attached to the arm $Q^4$ of the latter lever is a spring $Q^6$, acting to keep the arm $Q^4$ of this lever in contact with the arm $Q^3$ of the lever $Q'$ $Q^3$, and to move lever $Q^4$ $Q^5$ to shift the belt when arresting-arm $Q^3$ is moved to clear the arm $Q^4$.

Where no tube is delivered to the carrier, it is important to provide for getting rid of the filler which should be delivered to the absent tube, both because the tobacco may get mixed up in the machinery and because it is important that the latch-lever, above described, should meet with no obstruction when no cigarette is made. For this purpose it is that I arrange my tubes upon the carrier in an oblique position and provide the openings $K^5$ (see Figs. 33 and 36) in line with the notches K³. By this arrangement, when no tube is brought to registry with the feed-box, the filler is shot out in a straight line by the action of a plunger, passing through the notch K³ and through the opening K⁵ in the plate K², which is opposite to said notch.

Having now described my invention, what I claim as new, and desire to secure by Letters Patent, is—

1. In a machine adapted to form cigarette-tubes from truncated tapering blanks, the combination with a blank-supporting table B of angularly-set side guides B' B', an intermittently-acting plate arranged to act between the side guides and press the blanks down upon the table, and means for feeding said blanks over the table.

2. In a machine adapted to form cigarette-tubes, the combination with the intermittently-rotating matrix-holder C of blank-receiving tables C', inclined outwardly-converging side guides C²⁴ situated on each side of said tables, mechanism arranged to feed blanks upon the tables and between the side guides, and mechanism, substantially as specified, for converting the blanks into tubes as the matrix-holder revolves.

3. In combination with a series of cigarette-tube-forming mandrels having serrated faces, a mechanism acting to successively fold and crimp a paper blank upon said mandrels, and an oiling device arranged to act to apply a film of oil to the serrated face of each mandrel.

4. In a machine adapted to form cigarette-tubes, the combination with the intermittently-rotating matrix-holder C and the mandrels connected therewith as described, of an oiler arranged to come in contact with each mandrel in turn and apply a film of oil to the outer face thereof.

5. In a machine adapted to form cigarette-tubes, the combination with the intermittently-revolving matrix-holder C, and the mandrel-supporting slides C⁵ and C⁶ carrying mandrels, of the intermittently-moving mandrel-mover C¹².

6. In a machine adapted to form cigarette-tubes, the combination with the intermittently-revolving matrix-holder C, of the slides C⁵ and C⁶ movably mounted on the holder and carrying the mandrels C⁸, C⁹, C¹⁰ and C¹¹, of an intermittently-acting mandrel-mover consisting of a lever C¹², C¹⁴, a spring arranged to hold arm C¹² normally in its uppermost position, and a finger as C¹⁶ connected to lever-arm C¹⁴ and arranged in the path of a moving part of the machine.

7. In a machine adapted to form cigarette-tubes, the combination with the intermittently-revolving matrix-holder C, and the mandrel-supporting slides C⁵ and C⁶ carrying mandrels, of an intermittently-moving mandrel-mover consisting of a lever C¹² C¹⁴, a pivoted guide-arm C¹⁸, a rod C¹⁵ attached to lever-arm C¹⁴ and supported by arm C¹⁸, an adjustable spring-stop C¹⁶ secured to rod C¹⁵ and arranged in the path of a reciprocating part of the machine, and a spring arranged to hold the arm C¹² normally in its uppermost position.

8. The combination with a mandrel of the reciprocating tube-closing jaws D' D² and the curler D³ mounted on one of said jaws, a portion of which extends along the inside of said jaws and so that the curling of the seam is more or less accomplished while it is still clamped between the jaws and mechanism for reciprocating the said jaws along the mandrel and for opening and closing the same.

9. The combination with a cigarette-tube mandrel having a serrated face, of a stripper arranged to act intermittently against a smooth side of the mandrel to strip the tube therefrom by frictional contact.

10. In a cigarette-machine the combination with a series of mandrels and mechanism for forming blanks into cigarette-tubes around the same, of a revolving stripper-wheel I arranged to come in contact with each mandrel when the tube is completed thereon, and to draw said tube off or partially off of the mandrel.

11. In a cigarette-machine the combination with a series of mandrels, and mechanism for forming blanks into cigarette-tubes around the same, of a revolving stripper-wheel I and mechanism for intermittently moving said wheel against each mandrel, in turn, to draw the tube off or partially off the mandrel.

12. In a cigarette-machine the combination with a series of mandrels and mechanism for forming blanks into cigarette-tubes around the same, of a revolving stripper-wheel I, and mechanism for intermittently moving said wheel against each mandrel in turn to draw the tube off or partially off the mandrel, said mechanism being arranged to first press the stripper-wheel hard against the mandrel and then to relax the pressure after the tube has been started.

13. In a cigarette-machine the combination with a series of mandrels, and mechanism for forming blanks into cigarettes around the same, of a revolving stripper-wheel I, a pivoted lever-arm I' upon which said stripper-wheel is carried, means for transmitting motion carried on said lever-arm and leading to the stripper-wheel, and a cam, as I⁴, arranged to move the arm I' at proper intervals and carry the wheel I against each mandrel in turn.

14. In a cigarette-machine the combination with one or more mandrels and mechanism for folding blanks into tubes around the same, of a pusher J and mechanism for actuating the same as described, to move it forward to push a completed tube off of said mandrel or mandrels.

15. In combination with one or more movable cigarette-tube mandrels, a stripper mechanism acting to successively engage the tubes on the mandrels and to start the tubes from the mandrels by frictional contact, and a pusher J arranged to act after said stripper to push the tube entirely off the mandrel.

16. In a cigarette-machine the combination with a series of mandrels and mechanism for forming blanks into cigarette-tubes around the same, of a revolving stripper-wheel I arranged to come in contact with each mandrel when a tube is completed thereon to draw said tube off or partially off the mandrel, a pusher J and mechanism for actuating said pusher to throw the tube off the mandrel.

17. In a cigarette-machine the combination with a series of intermittently-moving mandrels and mechanism for forming blanks into tubes thereon, of an intermittently-moving carrier having a series of tube-receiving recesses, each adapted to register in turn with one of the mandrels of the series and to receive a tube therefrom, and mechanism adapted to strip each mandrel in turn and carry the tubes into the recesses of said carrier.

18. In a cigarette-machine the combination with a series of intermittently-moving mandrels and mechanism for forming blanks into tubes thereon, of an intermittently-moving carrier having a series of tube-receiving recesses, each adapted to register in turn with one of the mandrels of the series and to receive a tube therefrom, mechanism adapted to strip each mandrel in turn and carry the tubes into the recesses of said carrier, a filler-box with which each carrier-recess registers in turn, and a plunger adapted to move through said box and push a filler into each tube as it registers therewith.

19. In a cigarette-machine the combination with a series of intermittently-moving mandrels, and mechanism for forming blanks into tubes thereon, of an intermittently-moving carrier made up of two plates, as $K'$ $K^2$, with an open space between them, said plates having recesses, as $K^3$ $K^4$, arranged at different levels and so that a tube resting therein will lie at an angle to the filler feed-box, while said recesses are in register therewith, the rear plate $K^2$ having a recess, as $K^5$, in line with recess $K^3$, a stationary chute L with which each mandrel and each pair of carrier-recesses register in turn and by which the tube is guided from the mandrel to proper position on the carrier, mechanism for drawing the tubes off of the mandrel and through the chute to the carrier, a filler feed-box and a plunger adapted to push the filler into the inclined tube on the carrier or in its absence into recess $K^5$.

20. In a cigarette-machine the combination with a series of intermittently-moving mandrels and mechanism for forming blanks into tubes thereon, of an intermittently-moving revolving carrier made up of two plates, as $K'$ $K^2$, with an open space between them, said plates having recesses, as $K^3$ $K^4$, located to register with the filler feed-box and arranged at different levels so that a tube resting thereon will lie at an angle to the mandrel and filler feed-box, the rear carrier-plate having the recess $K^5$ in line with recess $K^3$, a stationary inclined chute L with which each mandrel and each pair of carrier-recesses register in turn and by which the tube is guided from the mandrel to proper position on the carrier, mechanism for drawing the tubes off of the mandrel and through the chute to the carrier, a filler feed-box, and a plunger adapted to push the filler into the inclined tube on the carrier or in its absence into recess $K^5$.

21. The combination with the series of mandrels and the carrier-wheels $K'$ and $K^2$, of the chute L having its lips $L'$ $L^2$ at one point closer together than the diameter of the cigarette-tube.

22. The combination with the series of mandrels and the carrier-wheels $K'$ and $K^2$, of the chute L having its lips $L'$ $L^2$ at one point closer together than the diameter of the cigarette-tube and a guide-finger $L^3$ extending from the chute over a portion of the carrier-wheel.

23. In combination with a filler feed-box and a plunger arranged to push the filler out of the same, a support arranged to bring a cigarette-tube into register with the feed-box and to hold it at an angle thereto, said support being formed to give passage to a filler in line with the feed-box when no tube is brought to register.

24. In combination with a filler feed-box and a plunger arranged to push the filler out of the same, a carrier arranged to bring a cigarette-tube into register with the feed-box and to hold it at an angle thereto, said carrier being formed to give passage to a filler in line with the feed-box when no tube is brought to register.

25. The combination with a carrier adapted to receive and support cigarette-tubes, a filler feed-box, a clamp M, clamp-actuating mechanism whereby said clamp is moved toward and against the outer end of the blank when its inner end registers with the feed-box to hold it against the box, and a plunger arranged and operated to thrust the filler out of the feed-box and into the tube while said tube is abutted against said clamp.

26. The combination with a support operating to aline a cigarette-tube with a feed-box, a filler feed-box having at its delivery end a conical recess as $N^2$, means for thrusting a tube into said recess when brought to register therewith by the support and a plunger moving in the feed-box and operating to thrust a filler into the tube.

27. The combination with a carrier adapted to receive and transport cigarette-tubes, a filler feed-box having at its delivery end a conical recess as $N^2$, means for thrusting a tube into said recess when brought to register therewith by the carrier and a plunger moving in the feed-box and operating to thrust a filler into the tube.

28. The filler feed-box having a seat for one end of a cigarette-tube, a clamp arranged to engage the other end of the tube, a plunger arranged to push the filler out of the box and into the tube, said plunger having motion sufficient to push the filler into the tube and to push the filled tube out of engagement with the box, and clamp-actuating mechanism arranged to thrust the clamp back after the tube is filled and to carry it forward to engage a new tube.

29. The combination with the carrier adapted to receive and transport cigarette-tubes a filler feed-box having a conical recess $N^2$ at its outer end, a clamp M, clamp-actuating mechanism whereby said clamp is moved toward and against the outer end of the blank and the blank grasped between said clamp and the conical recess $N^2$ when its inner end registers with the feed-box and a plunger arranged and operated to thrust the filler out of the feed-box and into the tube while said tube is so grasped.

30. The combination with the carrier adapted to receive and transport cigarette-tubes, a filler feed-box having a conical recess $N^2$ at its outer end, a clamp M having a projecting finger $M'$, a clamp-actuating mechanism whereby said clamp is moved toward and against the outer end of the tube and the tube grasped between said clamp and the conical recess $N^2$ when its inner end registers with the feed-box, said recess $N^2$ and finger $M'$ being arranged to lift the tube slightly above the recesses in the carrier, and a plunger arranged and operated to thrust the filler out of the feed-box and into the tube while said tube is so grasped.

31. The combination with the carrier of the filler feed-box and the clamping means arranged to register with the two ends of a cigarette-tube while on the carrier during a period of rest, a plunger, means for actuating said plunger to thrust a filler into the tube, a longitudinally-movable rod $M^2$ to which one part of the clamp is secured, an adjustable stop $M^5$ secured to said rod to regulate the movement of the clamp toward the tube, and reciprocating mechanism, as rod $M^6$, acting to move rod $M^2$ forward and backward whereby to clamp the tube before the filler is thrust into it and release it when filled.

32. The combination with the carrier of the filler feed-box and the reciprocating clamp M arranged to register with the two ends of a cigarette-tube on the carrier during a period of rest, a plunger, means for actuating said plunger to thrust a filler into the tube, a longitudinally-movable rod $M^2$ to which the clamp is secured, an adjustable stop $M^5$ secured to said rod to regulate the movement of the clamp toward the tube, an elastic finger $M^4$ and finger $M^3$, a reciprocating rod $M^6$ located and constructed to engage the fingers $M^4$ and $M^3$ and move the rod $M^2$ and clamp M forward to engage the tube prior to the filling thereof, and to move said rod and clamp backward and free the tube after it is filled.

33. In a cigarette-machine, the combination of a tube-carrier, and of means for filling the tubes, of a latch as O, means for alternately drawing said latch away from the path of the tube and pressing it against a filled tube, and means connected to the latch for stopping the machine arranged to be thrown into operation by the passage of said latch beyond the line at which it is supported by a filled tube.

34. In a cigarette-machine the combination of a tube-carrier and means for filling the tubes, of a latch-lever, as O, having capacity of motion in two directions, disconnecting mechanism for stopping the machine connected to said latch-lever so as to be actuated by the motion of said latch-lever in one direction, positively-actuated mechanism, as cam $P'$, adapted to move the latch-lever in its other direction of movement and so as to raise it above each tube in the carrier as it comes to the position in which it is filled and to release it so that it will fall upon said tube after the filling mechanism has operated, said positively-actuated mechanism being also adapted to engage the latch-lever and move it in its other direction of movement when it is not sustained by a filled tube, whereby the machine is stopped in case of its failure to make, properly place, or fill each consecutive tube.

35. In a cigarette-machine the combination with a tube-carrier and means for filling the tubes, of a latch-lever O pivoted on or to a longitudinally-movable rod $O^2$, disconnecting mechanism arranged to be actuated by the longitudinal movement of said rod, a cam P having a face $P'$ formed and placed so as to raise lever O above each tube on the carrier and hold it so raised until the tube-filling mechanism has operated and having a notch $P^2$ formed and arranged to allow the lever O to fall and to engage and move it longitudinally when not sustained above said notch by a filled tube.

HUGO BILGRAM.

Witnesses:
CHARLES F. ZIEGLER,
D. STEWART.